United States Patent [19]
Sugihara

[11] 3,770,883
[45] Nov. 6, 1973

[54] COLOUR SYNCHRONIZING SYSTEM FOR A PAL COLOUR TELEVISION RECEIVER

[75] Inventor: Yasaumasa Sugihara, Kawasaki, Japan

[73] Assignee: The General Corporation, Kawasaki-shi, Kanagawa-ken, Japan

[22] Filed: Feb. 11, 1972

[21] Appl. No.: 225,397

[30] Foreign Application Priority Data
June 9, 1971 Japan ............................... 46/41279

[52] U.S. Cl. ............................................. 178/5.4 P
[51] Int. Cl. ............................................. H04n 9/46
[58] Field of Search ................................. 178/5.4 P

[56] References Cited
UNITED STATES PATENTS
2,736,859 2/1956 Pritchard et al.................. 178/5.4 P

*Primary Examiner*—Robert L. Griffin
*Assistant Examiner*—George G. Stellar
*Attorney*—Ernest A. Greenside

[57] ABSTRACT

Colour synchronizing system for a colour television receiver is constructed according to a signal transmission system in which a pair of colour signals effect simultaneous quadrature balanced modulation of a colour subcarrier with respect to first and second mutually perpendicular modulation axes, the second of which undergoes phase alternation of 180° for successive horizontal lines and in which the resulting colour television signal includes a colour sync signal rendering it possible to discern the alternating polarities of a chrominance signal. Said colour sync signal includes first and second components carried on the initial part of each horizontal line so as to appear concurrently or in succession and has a phase displacement of 90° to each other, the first component being of a fixed phase, and the second component being of a phase which is periodically switched in a manner corresponding to the phase alternation of the second modulation axis for successive horizontal lines. For demodulation of the chrominance signal along the first modulation axis not undergoing phase alternation, an instantaneous reference subcarrier is used which is obtained by phase modulation, with a saw-tooth wave having a frequency equal to half the line frequency, of an offset subcarrier of a frequency of $fsc \pm 2n - 1/2\,fH$, where $fsc$ denotes the frequency of a colour subcarrier, $fH$, line frequency and $n$ a positive integer.

7 Claims, 12 Drawing Figures

COLOUR SYNCHRONIZING SYSTEM FOR A PAL COLOUR TELEVISION RECEIVER

Figure 1:
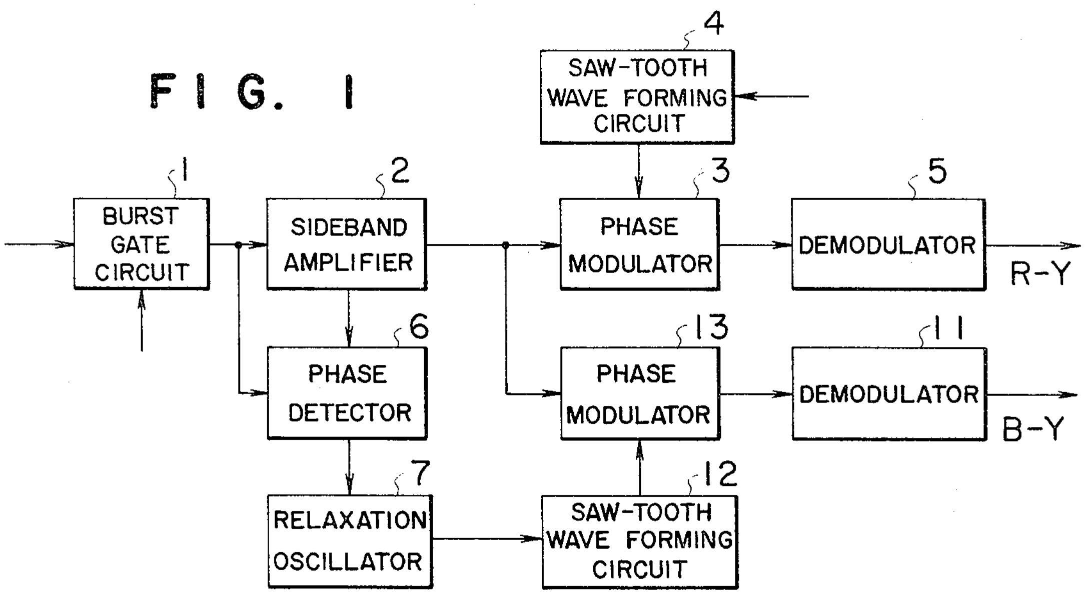

The invention relates to a colour synchronizing system in a colour television receiver incorporating PAL (phase alternation by lines) or similar signal transmission system in which a pair of colour signals effect simultaneous quadrature balanced modulation of a colour subcarrier with respect to mutually perpendicular first and second modulation axes, the second of which is reversed in phase by 180° for successive horizontal lines.

A colour television receiver incorporating such a signal transmission system requires, for demodulation from a chrominance signal of colour components along the first and second modulation axes, a pair of reference subcarriers each of which maintains a fixed phase relationship with the chrominance signal. Once of these reference subcarriers should have a fixed phase of 0° coincident with the first axis, while the other should have a phase displacement of 90° with respect to the first axis and a phase alternation of 180° for successive horizontal lines, which alternation must correspond to the periodic switching of the phase of the second axis. One technique for automatically accomplishing the phase control of these reference subcarriers is disclosed in German Pat. No. 1,260,520, which proposes the use of a colour sync signal or colour burst contained in a colour television signal and comprising first and second components appearing, coincident in time or successively, in the initial part of each horizontal line, these components have a phase displacement of 90° with respect to each other, with the first component being of a fixed phase while the second component having a phase which periodically alternates by 180° of successive horizontal lines in corresponding manner to the periodic switching of the phase of the second modulation axis.

In the currently prevailing PAL system, the above mentioned first and second colour sync signal components appear concurrently in time as a synthesized signal so that the latter bears an alternating phase of +45° and −45° for successive horizontal lines. The synthesized colour sync signal is separated in a receiver into the two components, and the first component is used for synchronization of reference subcarrier while the second component is used to control the periodic switching of the phase of one of the subcarriers. In a convention colour television receiver according to the PAL system, the reference subcarrier that is to be used to demodulate a colour difference signal along R–Y axis, which corresponds to the second modulation axis mentioned previously, from a chrominance signal is obtained typically by a technique mentioned in the following: A colour sync signal is initially extracted from a colour television signal and is phase demodulated to form a "discriminating control voltage" having half the horizontal scanning frequency. The control voltage thus formed provides synchronization of the oscillation of a square wave to produce an output waveform having the duration of a horizontal scanning line, hereinafter referred to as "line period." Such output waveform is applied as a voltage input to a switch, which is operable to effect change-over between a pair of output waveforms from a local oscillator which have a phase difference of 180° to each other, the oscillator being synchronized with the fundamental frequency of the colour burst received.

On the other hand, the inventor has proposed in a copending U. S. patent application Ser. No. 148,724, now U.S. Pat. No. 3,730,981, an improved colour synchronizing system for a colour television receiver which obviates the need for the provision of the above mentioned switch in order to control the 180° phase alternation for one of the reference subcarriers which are used in the demodulation of a chrominance signal. Briefly, the proposed colour synchronizing system disclosed in the application Ser. No. 148,724 achieves demodulation of colour signal along the modulation axis that undergoes 180° phase reversal by producing a subcarrier of a frequency $fsc \pm (2n-1)/2\, f_H$, where fsc denotes the frequency of a colour subcarrier, $f_H$ a horizontal line frequency and $n$ a positive integer, and by phase modulating the subcarrier with a saw-tooth wave having the line frequency to yield a reference subcarrier whose phase is kept constant during each line period. Synchronization for the subcarrier having the frequency $fsc \pm (2n-1)/2\, f_H$ is achieved by using one of the sideband waves contained in the colour sync signal therefor. In said application, the demodulation of colour signal along the modulation axis having a fixed phase is effected by the use of a reference subcarrier having the same frequency as the colour subcarrier and synchronized with the fundamental wave of the colour sync signal.

In one aspect, therefore, the invention resides in a further development of the principle of the application above referred to whereby to permit the use of the subcarrier having the output frequency of the local oscillator which is different from that of the colour subcarrier in the demodulation of colour signal along the modulation axis that does not undergo phase alternation as well.

In another aspect, the invention resides in an improved colour synchronizing system for a colour television receiver in which the second component alone of the colour sync signal is sufficient to provide both synchronization of a reference subcarrier and proper control of the periodic switching thereof.

In accordance with the invention, in an arrangement in which a single local oscillator provides a pair of reference subcarriers required for the demodulation of B–Y and R–Y colour difference signals corresponding to the first and second modulation axis, respectively, the output frequency of the oscillator is chosen by $2n - 1/2$ times, preferably one-half time the line frequency higher or lower than the frequency of the colour subcarrier. Because of the fact that the output frequency of the local oscillator is different or offset from the frequency of the colour subcarrier, the local oscillator output as used for the purpose of the invention will be referred to hereinafter as "offset subcarrier" to provide distinction over the reference subcarrier used in the prior art.

For normal synchronous detection, the offset subcarrier must be processed in a certain way. As regards the R–Y axis which undergoes phase alternation, the offset subcarrier is phase modulated by a saw-tooth wave having the same frequency as the line frequency. In this connection, it should be understood that as far as the resulting frequency is concerned, the similar function will be obtained by frequency modulation as well. Hence, it is intended that reference to the phase modulation by such a saw-tooth wave also covers such frequency modulation. As a result of the phase modulation, it is possible to maintain a fixed phase difference, including null, between the phase modulated offset subcarrier and the colour subcarrier for the trace time of each horizontal line, thereby enabling the former to be used in the demodulation of a chrominance signal to derive an intended signal. The phase modulated offset subcarrier will be hereinafter referred to as "instantaneous reference subcarrier." As regards the demodulation along the modulation axis not undergoing phase alternation or B–Y axis, the offset subcarrier from the local oscillator is phase modulated by a saw-tooth wave of a frequency which is equal to half the line frequency, such phase modulation being equivalent in function to that mentioned above. This results in a similar effect as before, producing an instantaneous reference subcarrier that has a fixed phase with respect to the colour subcarrier for the trace time of each horizontal line. This instantaneous reference subcarrier carrier can be used in the demodulation with respect to B–Y axis, that is, the modulation axis of a fixed phase. The saw-tooth wave having a period which is equal to twice the line period, i.e., the reciprocal of the line frequency, can conveniently be formed from discriminating signal pulses having a period equal to double the line period which are obtained by phase detection of the colour sync signal and the offset subcarrier that is synchronized with one of the sideband waves thereof.

The present invention primarily deals with the generation of a reference subcarrier for demodulation of B–Y axis, in the form of instantaneous reference subcarrier derived by phase modulation of an offset subcarrier with a saw-tooth wave of a frequency which is equal to half the line frequency. Thus by combining the present invention with the demodulation system disclosed in the patent application above referred to, there will be established a novel colour synchronizing system which is entirely different from the prior art system involving the use of a switch. With the novel colour synchronizing system, it is possible to determine a desired phase relationship between the pair of reference subcarriers in a positive manner, thereby allowing demodulation of colour signals accurately and free from distortion. The arrangement used is simple and has a favorable noise suppression characteristic.

Figure 2:
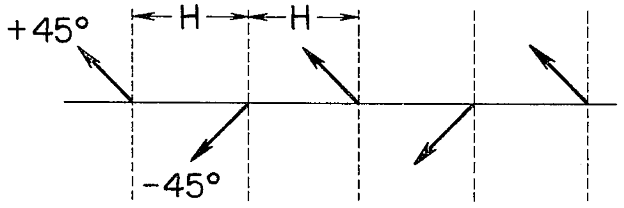
Figure 3:
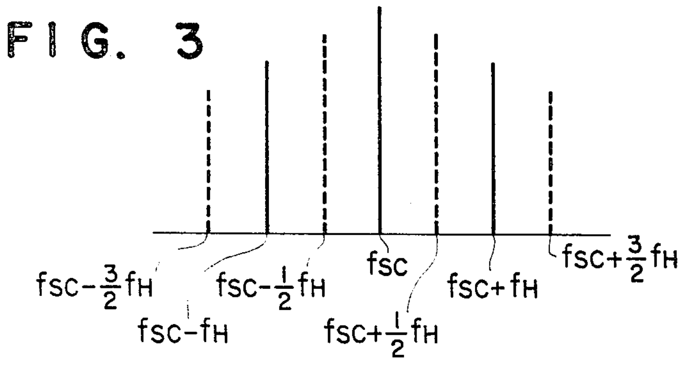
Figure 4:
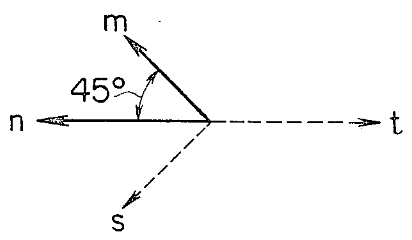
Figure 5:
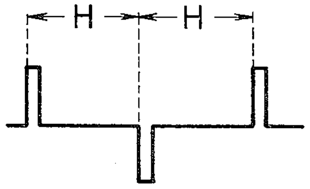

For a better understanding of the invention, it will be described more fully with reference to the drawings; in which FIG. 1 is a block diagram of one embodiment of the invention, FIG. 2 is a vector diagram of colour bursts, FIG. 3 is a schematic representation of the frequency spectrum of the colour bursts shown in FIG. 2, FIG. 4 is a vector diagram illustrating the phase relationship between the colour burst and the offset subcarrier, FIG. 5 shows the wave form of identifying control pulses obtained at the output of the phase detector for the phase relationship shown in FIG. 4, FIGS. 6*a* to 6*d* graphically illustrate the operation of the two phase modulator scheme shown in FIG. 1.

Figure 7:
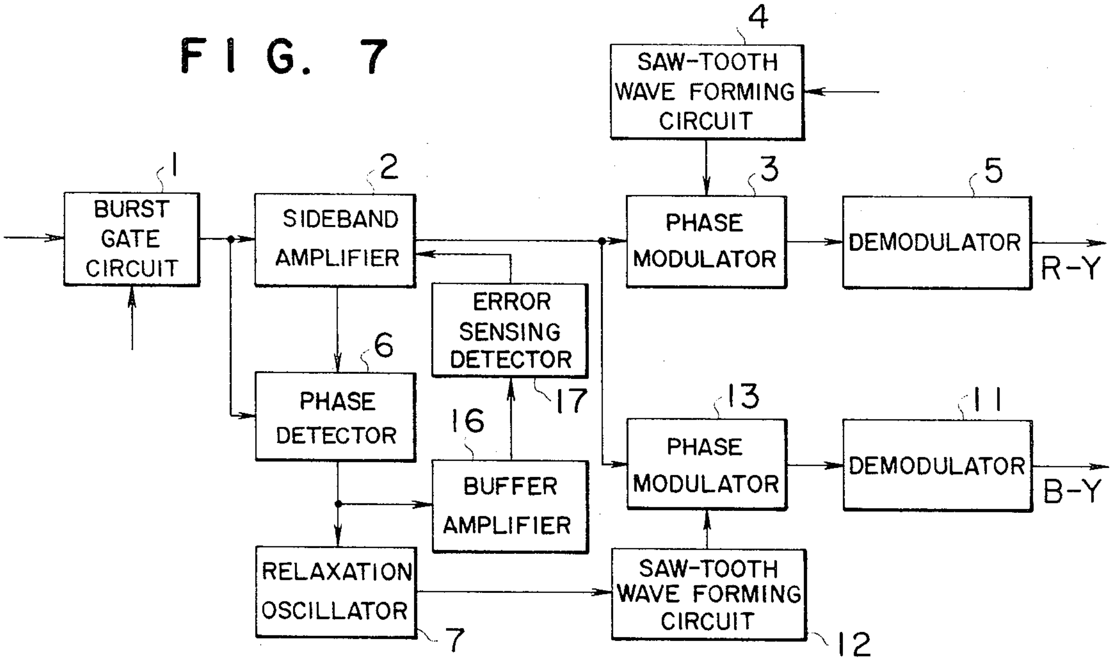
Figure 8:
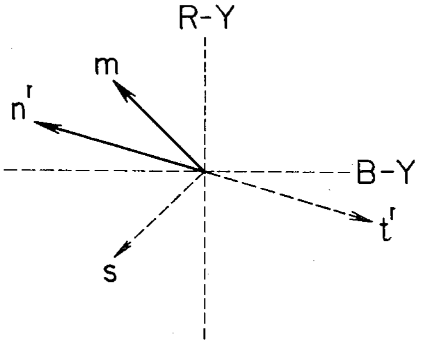
Figure 9:
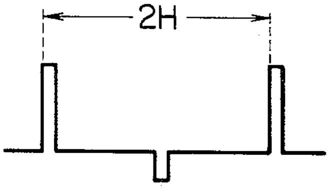

FIG. 7 is a block diagram of another embodiment of the invention incorporating an automatic phase control circuit, FIG. 8 is a vector diagram similar to FIG. 4, but showing a different pulse relationship, FIG. 9 is a similar view to FIG. 5 for the phase relationship shown in FIG. 8.

Referring to FIG. 1, there is shown in block form an embodiment of the invention including a burst gate circuit 1. As is known, a chrominance signal is supplied to this circuit together with gate pulse which may be horizontal fly-back pulse. The gate circuit 1 is opened for the duration of the gate pulse to provide at its output a colour sync signal alone, as separated from the chrominance signal. In the current PAL system, such a colour sync signal contains two signal components concurrently and has an alternating phase of +45° or −45° for successive lines, as shown in FIG. 2. As shown in FIG. 3, the frequency spectrum of the colour burst includes sidebands, equal to the frequency of the offset subcarrier, which are of frequencies higher or lower than the frequency, $fsc$, of the colour subcarrier by an odd multiples of half the line frequency, $f_H$, or sidebands of frequencies $fsc \pm 2n - 1/2\, f_H$, $n$ being an integer. The output from the burst gate circuit 1 is applied to a sideband amplifier 2 incorporating a crystal resonator to produce an amplified offset subcarrier, which is a selected one of the sidebands contained in the second component of the colour sync signal. Thus the sideband amplifier 2 virtually acts as a local oscillator, and may in fact be replaced by a local oscillator with automatic phase control to which the output of the gate circuit 1 is applied. Such an oscillator is well known, and since it does not form a part of the invention, it will not be described herein. It will also be appreciated by those skilled in the art that the sideband amplifier may also be replaced by a ringing oscillator. It should be understood, therefore, that the following description made with reference to the sideband amplifier 2 equally applies to these local oscillator and ringing oscillator.

The output of the sideband amplifier 2 which is a selected offset subcarrier is fed to a phase modulator 3, to which is also supplied from a saw-tooth wave forming circuit 4 a modulating wave having a period of H, line period, to effect phase modulation of the offset subcarrier, whereby a periodically switched instantaneous reference subcarrier is obtained at the output of the phase modulator 3 for use in a demodulator 5 to derive a colour difference signal along the phase alternating modulation axis or R–Y axis.

According to the invention, the output of the sideband amplifier 2 is also fed to another phase modulator 13 to be subjected therein to phase modulation by a different saw-tooth wave having a frequency which is equal to half the line frequency and which is supplied from a separate saw-tooth wave forming circuit 12. As a result, the phase modulator 13 produces an instantaneous reference subcarrier of a fixed phase for use in a demodulator 11 which derives a B–Y colour difference component. The formation of the saw-tooth wave having a period equal to double the line period will be described below.

Reference numeral 6 denotes a phase detector has applied thereto the colour sync signal from the burst gate circuit 1 and the offset subcarrier from the sideband amplifier 2 with suitable phases. Assuming as shown in FIG. 4 that a certain colour sync signal had a phase represented by a vector $m$ while the offset subcarrier remained in the phase position shown by a vector $n$ during its horizontal retrace time, the next colour sync signal will have a phase indicated by a vector $s$ while the offset subcarrier will have a phase substantially as indicated by a vector $t$. Under this situation, the phase detector 6 will produce at its outputs identifying pulse signals as shown in FIG. 5 which reverse in phase in alternate line periods. Such pulse information having a period equal to double the line period is contained in the second component of the colour sync signal and hence is derived from the offset subcarrier. The phase detector 6 is operable to produce the identifying pulse signals for a phase relationship other than that depicted in FIG. 4, for example, for a phase relationship in which the vectors $n$ and $m$ are in phase. Statedly differently, the phase detector is also operative when the first and second components of the colour sync signal are not concurrently occurring as in the present PAL system colour television signal, but occur in succession. A relaxation oscillator 7 having a free oscillation frequency equal to half the line frequency is connected with the phase detector 6 so as to be synchronized with the output pulses therefrom which have a period equal to double the line period, and is followed by the saw-tooth wave forming circuit 12 which may comprise a charging and discharging circuit with a suitable time constant.

When the saw-tooth wave, thus formed, of a frequence equal to half the line frequency is used to phase modulate the offset subcarrier of a frequency of $fsc \pm 2n - 1/2 f_H$, there can be obtained an instantaneous reference subcarrier which maintains a fixed phase difference with respect to the colour subcarrier during two successive line periods except for the retrace time of the later line period. During the following two line periods, the instantaneous reference subcarrier obtained will have the same phase as the instantaneous reference subcarrier had during the trace time of the two preceding line periods. Thus all during the trace time of any line period, the instantaneous reference subcarrier produced by the phase modulator 13 will have a fixed phase difference with respect to the colour subcarrier, and therefore can be made coincident in phase with the latter.

Figure 6:
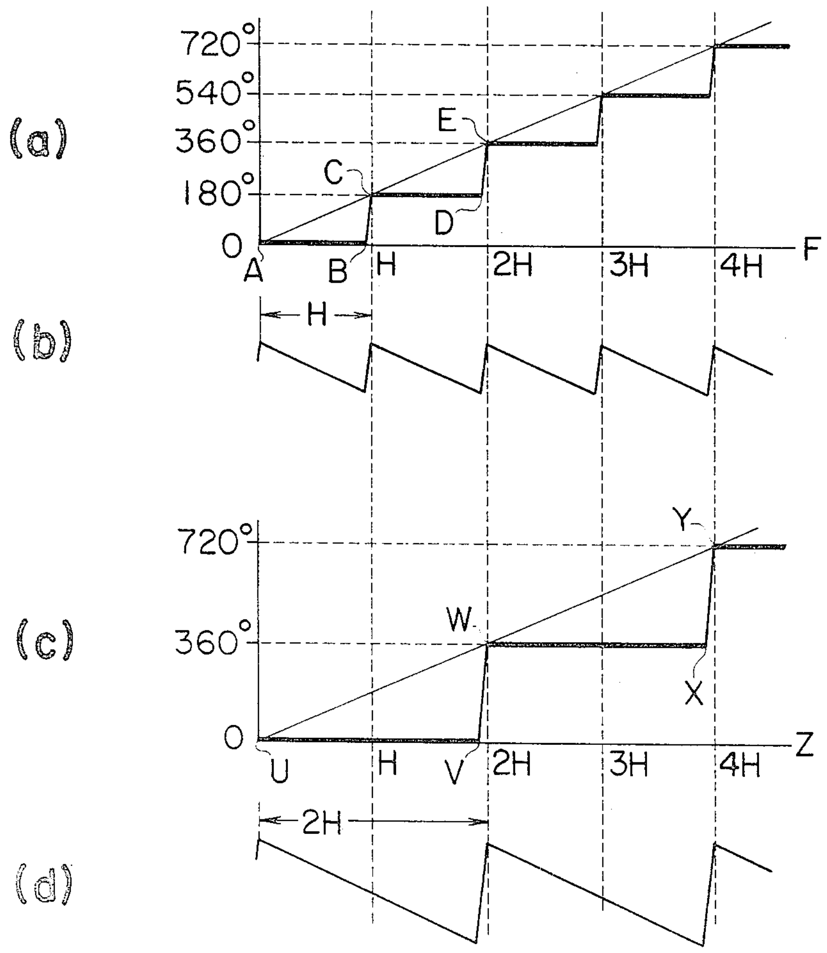

Referring to FIG. 6 with illustrates the operation of the two phase modulators 3 and 13. The respective phase relationships will be described. FIG. 6a shows graphically the operation of the phase modulator 3 which produces the instantaneous reference subcarriers for use in the demodulation with respect to the phase alternating modulation axis, and FIG. 6b shows the waveform of the modulating signal. Similarly, FIG. 6c graphically shows the operation of the phase modulator 13 which produces the instantaneous reference subcarrier for use in the demodulation with respect to the fixed phase modulation axis, and FIG. 6d shows the waveform of the modulating signal. In FIGS. 6a and c, the vectors corresponding to the output offset subcarries from the sideband amplifier 2 are represented by straight lines $\overline{ACE}$ and $\overline{UWY}$, respectively, and it will be seen that they vary continuously. The operation in the both phase modulators 3 and 13 are essentially similar, the only difference being that the modulating signal has a period equal to the line period or double the line period. As a result of such difference, it follows that the phase of the output from one phase modulator 3 varies stepwise by an amount equal to 180° for every line period, generally in accordance with the broken line $\overline{ABCDE}$, while the phase of the output from the other phase modulation 13 varies stepwise by an amount of 360° in accordance with the broken line $\overline{UVWXY}$, thereby maintaining a fixed phase. Hence it will be understood that the output of the phase modulator 3 provides the necessary instantaneous reference subcarrier for the demodulation of R–Y colour difference component which alternates in phase periodically for every horizontal line, while the output of the phase modulator 13 provides the necessary instantaneous reference subcarrier of a fixed phase for the demodulation of B–Y colour difference component. This permits a stable demodulation of the chrominance signal.

While the frequency of the offset subcarrier remains stationary at a predetermined value, its phase may be subject to deviation from a given phase relationship with respect to the colour sync signal due to variation of temperature efficients of the circuit, aging or fluctuation of supply voltage. To avoid such deviation, the invention contemplates the use of an automatic phase control circuit for maintaining a fixed phase relationship between the colour sync signal and the offset subcarrier.

Another embodiment of the invention incorporating such an automatic phase control circuit is shown in FIG. 7 in which corresponding parts are designated by like reference numerals as used in FIG. 1. Additional numerals 16 and 17 denote a buffer amplifier and an error sensing detector, respectively. When the output of the phase detector 6 is represented by pulses of alternating polarities as shown in FIG. 6, this indicates that the offset subcarrier applied to the phase detector 6 from the sideband amplifier 2 has a correct phase intermediate the alternating phases of the colour sync signal as shown in FIG. 5. However, when a deviation occurs in the phase of the offset subcarrier as shown by a vector $n'$ in FIG. 8, the resulting output from the phase detector 6 will be of different magnitudes for the positive and negative pulses. Under such a situation, the buffer amplifier 16 operates to amplify the output of the phase detector 6 to a suitable magnitude and the error sensing detector 17 is operable to derive a control voltage in response to these differential magnitudes of alternating pulses, the control voltage being used to correct the phase of the local oscillator 2 properly.

While the foregoing description of the invention has been made with reference to the conjoint use of the invention with the colour synchronizing system disclosed in patent application Ser. No. 148,724, it is to be noted that this achieves a colour synchronizing system which depends for its operation solely on one of the two components of the colour sync signal in order to produce a pair of reference subcarriers of proper phases and synchronized with the chrominance signal.

I claim:

1. A colour synchronizing system for a colour television receiver for use in a transmission system such as PAL System in which the colour television signal includes a pair of colour signals providing quadrature balanced modulation of a colour subcarrier with respect to first and second mutually perpendicular modulation axes, only the second of which undergoes phase alternation of 180° for successive horizontal lines, and further includes a colour sync signal at the frequency of said colour subcarrier which provides indentification of said first and second mutually perpendicular modulation axes said system comprising means for providing an offset subcarrier of a frequency of fsc $\pm 2n - 1/2 f$H, where fsc denotes a colour subcarrier frequency, $f$H horizontal line frequency and $n$ a positive integer, means for phase modulating the offset subcarrier with a sawtooth wave of half the line frequency, and demodulation means to which the phase modulated offset subcarrier and said pair of colour signals are fed for demodulating the colour signal along said first modulation axis.

2. A colour synchronizing system according to claim 1, said system futher comprising amplifier means for extracting and amplifying one of the sideband waves of said colour sync signal to generate said offset subcarrier.

3. A colour synchronizing system according to claim 1, said system further comprising means for phase detecting said colour sync signal and said offset subcarrier to produce a control signal, and means responsive to said control signal to control the phase of said offset subcarrier.

4. A colour syncrhronizing system according to claim 1, said system further comprising means for phase detecting said colour sync signal and said offset subcarrier to produce pulses having a period equal to double the line period from which said saw-tooth wave is ultimately formed.

5. A colour synchronizing system according to claim 4, said system further comprising relaxation oscillator means having an oscillation frequency of half the line frequency, and means for supplying said pulses to said relaxation oscillator means for synchronizing the same.

6. Colour synchronizing system for a colour television receiver constructed for use in a signal transmission system such as PAL in which the colour television signal includes a pair of color signals providing quadrature balanced modulation of a colour subcarrier simultaneously with respect to first and second mutually orthogonal modulation axes, only the second of which undergoes phase alternation of 180° for successive horizontal lines, and further includes a colour sync signal at the frequency of said colour subcarrier which provides identification of said first and second mutually orthogonal modulation axes, said system comprising means providing a pair of reference subcarriers for demodulating said pair of colour signals along the two modulation axes, said means including means for generating an offset subcarrier of a frequency different from the frequency of said colour subcarrier in synchronism with one of the sideband waves of said colour sync signal, said frequency of the offset subcarrier being given by $fsc \pm 2n\text{-}1/2\ f\text{H}$, where $fsc$ denotes the frequency of said colour subcarrier, fH the line frequency and $n$ a positive integer greater than zero.

7. A colour synchronizing system according to claim 6, said system further comprising first and second means for phase modulating said offset subcarrier with sawtooth waves of frequencies equal to the line frequency and half the line frequency respectively, for providing said pair of reference subcarriers.

* * * * *